United States Patent [19]

Suominen

[11] Patent Number: 5,133,909
[45] Date of Patent: Jul. 28, 1992

[54] PRODUCTION OF BIOLOGICALLY DEGRADABLE FILMS

[75] Inventor: Hannu L. Suominen, Vantaa, Finland

[73] Assignee: Biodata Oy, Finland

[21] Appl. No.: 592,616

[22] Filed: Oct. 4, 1990

[30] Foreign Application Priority Data

Oct. 5, 1989 [FI] Finland ............... 894734

[51] Int. Cl.$^5$ ............ B29B 9/00; B29C 47/02; B29L 7/00
[52] U.S. Cl. .................... 264/7; 47/9; 260/DIG. 43; 264/13; 264/118; 264/121; 264/134; 264/211; 264/349; 525/938; 427/214; 427/414; 427/417
[58] Field of Search .......... 47/9; 260/DIG. 43; 525/938; 527/340; 264/211, 8, 118, 122, 7, 12, 13, 349, 121, 134; 427/214, 414, 417

[56] References Cited

U.S. PATENT DOCUMENTS

| | | | |
|---|---|---|---|
| 3,907,726 | 9/1975 | Tomiyama | 260/DIG. 43 |
| 3,909,468 | 9/1975 | Tanaka et al. | 260/DIG. 43 |
| 3,952,347 | 4/1976 | Comerford et al. | 260/DIG. 43 |
| 4,021,388 | 5/1977 | Griffin | 260/DIG. 43 |
| 4,207,221 | 6/1980 | Tobias et al. | 525/938 |
| 5,003,022 | 3/1991 | Nguyen et al. | 527/300 |

*Primary Examiner*—Jeffery Thurlow
*Assistant Examiner*—Mathieu Vargot
*Attorney, Agent, or Firm*—Steinberg & Raskin

[57] ABSTRACT

A biologically degradable film is prepared consisting of a synthetic polymer and a biologically degradable polymer. The biologically degradable polymer is divided into small particles in an aqueous suspension by means of enzymes that split and release small molecules from the surface of the biopolymer particles. After achieving desired particle size, an emulsion is formed with vegetable oil and the particles coated with enzyme protein become coated with vegetable oil, which at the same time interrupts the degradation of the biopolymer particles by the enzyme. The coated particles with the oil are separated from the suspension to remove small molecules after which the particles are re-dried and then pulverized. The final film is prepared in a film extruder in which the biopolymer is mixed with the synthetic polymer and possibly other additives that are generally used informing polymer films.

21 Claims, No Drawings

PRODUCTION OF BIOLOGICALLY DEGRADABLE FILMS

BACKGROUND OF THE INVENTION

The growing of plants in greenhouses made of plastic or glass is known. A clear cover can be penetrated by both short wave and long wave radiation in the range of visual light. It is also known that greenhouse covers transmit more short wave radiation than long wave radiation, the heating effect of the light in the green houses taking effect in that the short wave radiation is converted to long wave radiation within the greenhouse.

The greenhouse principal has also been used in growing fields in such way that covers have been formed to a bow over the surface of the field or the cover has been applied to the surface of the earth. The cover materials used for such purposes in the fields have been of plastic or paper through which the plants grow. This known technique produces several advantages, namely, temperature increase by using transmitting covers so that short wave radiation is converted to heat, the prevention of evaporation of the water by paper covers, and the hindering of the growing of weeds under covers using a film that transmits light.

The need for weed killers is the same when using clear covers or in the case of growing without any cover, and in some cases, even more so in the case of the use of covers because by using a clear cover the humidity is condensed on the inside of the film and good conditions are formed for the growth of weeds around the growing plants. Furthermore, the fact that the earth is exposed between the films as a result of earth terracing used to fasten the films, results in an improvement of the growing conditions for weeds.

Previously known films have been decomposed to small pieces as a result of ultraviolet radiation. Attempts have been made to achieve films that are degraded by ultraviolet radiation to such extent that microorganisms may be able to continue the degradation and to completely degrade the films. However, degradation in these previously known films has not been complete. In practice, the edge of the cover film covered by the earth remains in the field because the UV-radiation cannot transmit through the earth to degrade the film. Even a little piece of earth or a dust layer on the film hinders the energy of the UV-light to enter the film, which is needed for the degradation of the polymer bonds.

In theory, the films are degraded by means of UV-light even after the plants begin to cover the same, and further in theory, the degradation being to such small pieces that they do not cause problems in the field. In practice, however, the degradation is not complete as a result of UV-light, which results in more and more plastic material in the field because the synthetic polymer itself in the so called composite films is not biologically degraded. The synthetic polymers do not absorb water and since the biological degradation takes place by means of enzymes produced by microbes, no biological degradation can occur because these enzymes act only in the presence of water.

Synthetic polymers, the molecules of which consist of, for example, about 12,000 successive carbon atoms, should be degraded to about 500 pieces with the lengths of about 10 carbon atoms before the rate of biological degradation has any importance whatsoever. However, the structure of the plastic films is already essentially changed in the stage when the polymer has been degraded to pieces containing thousands of carbon atoms. A plastic film, degraded in this way, could cause serious environmental problems. As a result, the use of films of this type has recently decreased. Problems have also arisen from the toxic residues that are caused by such degradation.

Methods are also previously known in which the film is removed from the field after the growing season has ended. Use of such films is, however, very expensive. Furthermore, in previously known methods, it is mainly thin films that have been used, because their preparation is much cheaper. However, it is difficult to remove such films from the field because the films are easily decomposed. In previously known solutions, the film has covered only about 50-70% of the growing surface because it has become necessary to leave exposed earth between the films for the fastening terracing.

In the our earlier Finnish Application FI-891905, the problem of degradation of the film has been improved by fastening the film to the growing surface by quiltings, as a result of which the entire growing surface is covered by the film. In the solution of this Finnish application, the degradation of the film by means of UV-light is improved because the entire film is on the ground. However, the problem remains that even by use of a UV-degradable film, more and more plastic is retained in the field, because these films are not biologically degraded.

Biologically degradable materials can be degraded biologically as a result of their chemical structure, by the act of microorganisms, such as mould, fungi and bacteria, when they are put in contact with the earth, or by being brought into contact with microorganisms in another manner, under conditions in which the microbes can grow. The term "biologically degradable" is used herein to refer to degradation of the type in which the degradation takes place by the act of living organisms such as microorganisms. The term "degradable" per se, is used with reference to the degradation, of for example, ethylene polymers which, by the act of different additives or other substances degrade into smaller pieces, without microorganisms effecting such degradation.

Attempts have been made to study the biological degradation of plastic films, and even to provide this in different ways, for example, by means of mould cultures. (Compare with ASTM-Standard, STM G 21-70 1980, that has been used in the investigations of so called biological degradation of plastic materials). The growth of mould on plastic films has, however, not shown anything about the biological degradation despite the growing of the mould. The growth of mould on plastic films has been considered to be in correlation to the amounts of additives in the films, with no influence on the synthetic polymer itself.

Generally it can be stated that the film material is degraded into pieces if it does not contain antioxidants, but contains, for example UV-catalysts which break the C—C bond of the synthetic polymer molecule. If the plastic molecules contain double bonds, these are degraded with less energy, even without any catalyst.

The biological degradation of the synthetic material requires hydrophilic water soluble groups. The polymer must be broken so that such hydrophilic chemical group is formed that can be enzymatically degraded, for example a carbonyl or carboxyl group. The degradation product of the biological degradation of the film must be water, carbon dioxide and biomass.

Several attempts have been made to prepare such biologically degradable films that consist of a combination of a synthetic polymer and a biopolymer in which a catalyst sensitive to UV-light has generally been added. A substance that degrades synthetic polymers by using light as catalyst is known, for example, from the patent publication EP-230143.

It has been thought that synthetic plastic material is able to absorb water if hydrophilic groups are included therein by means of a biologically degradable polymer. Starch is the cheapest biologically degradable polymer for this purpose, the use of which, in addition, should decrease production costs of the film because its price is lower than that of the polyethylene. Since the gelatinized starch alone forms a very brittle film, that is sensitive to water, it is commonly known that the starch must be combined with other substances that can be used in the film in order to arrive at a satisfactory product.

Polyethylene (PE) is the most commonly used synthetic polymer for preparing films with desired physical properties. Early attempts to produce PE-films by blowing technique from compositions with a high proportions of starch, >30% (w/w) have, however, not been successful. The reason is that starch is a very coarse material (particle size 20–150 $\mu$m) that interferes with the making of thin films. Furthermore, in the blowing technique, the starch particle and the molten plastic mass move with different speeds in a blowing technique carried out at normal blowing temperatures (170° C.) which results in brittle and breakable material with holes being formed. In other words, it has not been possible to make such film by blowing because the film necessarily becomes too thick.

Attempts have also been made to bring chemical bonds about the starch particles in order to facilitate the mixing of the synthetic polymer therewith. Such films have been described, for example in the following patent publications, U.S. Pat. No. 4,337,181, GB-1,487,050 and GB-1,485,833. In these known films, the enzymes can in theory degrade the material because the material is, at least in theory, to some extent wet. However, the technique is very expensive and furthermore, the material has several disadvantages, namely, poor tensile strength, thick films cannot be produced and the films do not stretch.

Attempts have also been made to add other reactive groups into the film material, for example double bonds. When the material contains double bonds and it reacts with oxygen and a metal catalyst, (for example, $Fe^{3+}$), reactive peroxides (—C—O—O—C—) are formed. Thus, free oxygen atoms and radicals are formed resulting in the bonds between the carbon atoms being degraded, and for example carboxyl groups and smaller carbon-hydrogen chains are formed. The phenomenon has been used in films that contain a metal catalyst (note for example, Patent Publication EP-86 310 154.9). When the resulting film material contains carboxyl groups (RCOOH), the same can be degraded by the action of enzymes from the microorganisms if surrounded by water. In other words, reactive groups and catalysts have been added to the film material by means of which biologically degradable RCOOH— groups are obtained under given conditions. However, these materials are very expensive to produce.

In U.S. Pat. No. 4,337,181, starch, ethylene-acrylic acid copolymers, and optionally polyethylene have been mixed and blowed to a film by using additives that neutralize a portion of the functional acid groups of the copolymer. This method makes the use of wet starch possible, but requires expensive additives. According to the EP Patent Application 0 230 143, the photodegradation must be facilitated by using photodegradable substances that comprise a photosensitive substance and an ethylene/carbon monoxide copolymer. Preferably, the photosensitive substance is a heavy metal dithiocarbamate or a heavy metal dithiophosphonate. As previously stated, ethylene copolymers that contain carbonyl groups are degradable by means of ultraviolet light, but the life span of these copolymers, is not sufficiently long.

Additionally, U.S. Pat. No. 3,901,838, mentions films that consist of a biologically degradable thermoplastic polymer and a degradable ethylene polymer, the mixing being carried out in a conventional mixture and the powdering in a mill. British Patent No. 1,483,838, teaches a biologically degradable film comprising a biologically degradable substance that is homogenously dispersed in a material forming a non-biologically degradable film that is not dissolved in water, the biologically degradable substance being present in an amount of 40–60% of the weight of the film material. In this solution, the biologically degradable substance is a finely divided substance that absorbs water, the film being made of an aqueous dispersion of these substances. The film is, in other words, made from a dispersion in organic solvents or in aqueous systems and because of the physical properties, the same cannot be used as a growing film.

In summary, it can be stated that the degradation of cover films is a two-pronged problem. On the one hand, it is desired that the film not be degraded as long as it is used. On the other hand, when the use of the film is complete, it is desired that the same be returned to the ecosystem in a form that does not cause harm to the environment. Under these conditions, the macromolecules should be split into smaller compounds that in turn can be used as food for the organisms through which they should be returned to the food cycle.

For the most part of commercial vinyl plastics, polyethylenes, polypropylenes, polystyrenes, polyvinyl chlorides and aromatic polyesters withstand microbial degradation. The only polymers that are biologically degraded are highly oxidated products such as cellulose, aliphatic polyesters and polyurethanes based on polyester. Since these can be degraded to water soluble short chains, they can be used as food by microbes. Treatments that lower the molecular weight and perhaps also change the chemical structure, expose the polymers to the degradation action of the microbes. When, for examples polyethylene is acidified with nitrous acid, waxy compounds on which thermophilic mushrooms can grow, are obtained. An intensive ultraviolet radiation can also cause chemical changes in the plastics as, for example, forming of carbonyl groups in which ketones are a part of the metabolism of the microorganism.

UV-radiation, photo degradable additives, morphological surface, additives, antioxidants and molecular weight all have an influence on the biological degradation of polyethylene. The biological degradation of paraffin can be compared with the degradation of polyethylene. In the beginning of the degradation, the main influencing factor is the UV-light and/or oxidation agents. However, once the carbonyl groups have been produced, the microorganisms attack the same and degrade the polyethylene chain to shorter fractions, carbon dioxide and water being the end products. The biological degradation and the ambient factors have a strong synergism, which is why the result can never be explained by only one factor. This is because the degradation is a combined result of factors including temperature, UV-light, water, the microbes and their foods. The presence of water is always a condition for biological degradation.

SUMMARY OF THE INVENTION

It is a primary object of the present invention to provide a film which begins to degrade by the action of UV-light and which then is biologically degraded, and wherein the film despite being subject to these forms of degradation is sufficiently strong and stable to withstand an entire growing season and then to be biologically degraded during the next growing season.

It is a further object of the present invention to provide a film that is degraded by UV-light and which bonds water and is thus biologically degradable.

It is still a further object of the present invention to provide a material that is degraded in two stages, in the first stage being crumbled and then finally biologically degraded in the earth. The film is mechanically sufficiently strong to withstand application conditions and be degraded not later than during the following season so that the final biological degradation does not occur during the first growing season.

It is still another object of the present invention to provide a biologically degradable film based on a synthetic polymer, for example, a polyolefin, such as polyethylene or polypropylene, and a biologically degradable polymer such as starch or cellulose.

It is yet another object of the present invention to avoid the disadvantages of earlier materials that consist of biopolymers and synthetic polymers which formed a thick and brittle film which was too expensive for actual preparation and which either did not result in complete biological degradation or in which the biological degradation was too slow.

With the above and other objects in view, the present invention mainly comprises:

(a) finely dividing a biologically degradable polymer (biopolymer) into small particles in an aqueous suspension by means of enzymes that split said biologically degradable polymer to smaller macromolecules and release small molecule compounds from the surface of the biologically degradable polymer particles, (b) emulsifying the thus obtained suspension of particles, after the desired particle size has been achieved, in a vegetable oil so that the particles that are coated with enzyme protein become coated with vegetable based oil whereby at the same time the degradation action of the enzyme is interrupted, (c) separating the oil-coated particles from the suspension to remove the small molecules after which the particles are dried and pulverized, and (d) forming a final film in a film extruder after mixing the biopolymer with a synthetic polymer. The synthetic polymer may contain additives generally used in such films.

The plastic film of the present invention is mainly characterized in that the biologically degradable polymer is homogeneously distributed in the synthetic polymer in particle form, there is a protein layer around the biologically degradable particles and an oil film that covers the protein layer.

The synthetic polymer that is used according to the present invention can be any olefin and there is no problem with the melting index of the olefin. Both linear components such as LLDPE, LDPE or HDPE or branched forms can be used. There are, however, certain properties that the polymers should have.

For example, the synthetic and biological material must fit. In other words, the biopolymer that is mixed with the synthetic polymer must be able to withstand the melting temperature of the synthetic polymer used in the preparation of the premixed batch or master batch which used in connection with blowing and drawing of the film. By proceeding in accordance with the present invention, the biopolymer can be homogenously distributed in the synthetic polymer, due to the small particle size of the biopolymer and the manner of coating. Furthermore, the synthetic polymer should not contain any antioxidants that prevent the degrading effect of UV-light and peroxides.

The biopolymer to be used can be made of various different starting materials such as starch, cellulose, rye flour, wheat flour and other biological materials that are milled. In earlier attempts to mix biopolymers with synthetic polymers, the particle size, which was too big, has caused problems and it was not possible to make a film, in addition to which the large particles are difficult to mix in the melt mass.

By proceeding in accordance with the present invention, particles are used of such small size (smaller than 10 $\mu$m), preferably 0.5-5 $\mu$m, that is is possible to produce a film having a thickness of 20-40 $\mu$m, and in some cases even 10 $\mu$m. By the use of particles sizes which are so small according to the present invention, it is possible to include in the synthetic polymer 40% of such biopolymer materials that have not been chemically modified. Particles of such small size cannot be made in previously known manner using mills. In accordance with the present invention, enzymes are used to make the sufficiently small particle size of the biopolymer. Thus, for example, the $\alpha$-amylase enzymes ($\alpha$-1,4-glucan-4-glucan-hydrolase) split dextrines from starch, which are gradually released from the larger particles. If, for example, cellulose is used, the usable enzymes are the cellulases, for example 1,4-$\alpha$-D-glucanase, that split cellulose dextrines or cellobiohydrolases from cellulose into cellobiose products. In this manner, the biopolymer can finally be completely degraded and dissolved in water.

When it is desired to degrade the biopolymer particles in the invention to only a given limited size, the process can simply be interrupted when the desired particle size has been achieved, this being accomplished by the addition of the vegetable oil, and generally an emulsifier, to the suspension which is vigorously stirred. This results in a vegetable based oil layer being formed on the enzyme protein on the surface of the particle, for example, soya, rape, sunflower, or another corresponding oil. Simple mixing of the biopolymer and the oil does not lead to the desired results. However, the biopolymer particles are dissolved in water, and for example, calcium chloride ($CaCl_2$) is added to the suspension so that the ionic strength is suitable for the enzyme and in the case of $\alpha$-amylase), the concentration of $Ca^{2+}$ of the co-factor of the enzyme is suitable for the action of the $\alpha$-amylase. In addition, the pH value of the suspension is regulated so as to be suitable for the action of the enzymes. According to the invention, it is advantageous to use an α-amylase whose activity depends on the temperature (for example, high temperature α-amylase KLAA). The mixing of the biopolymer first takes place in cold water if starch is used, to prevent gelatinization, and then the system is warmed to be suitable for the action of the enzyme, which in the case of KLAA is to a temperature of about 55° C.

The entire process is carried out in a large reactor vessel in which there is a mixture surrounded by a mantle. The temperature is regulated in known manner, for example, by means of a thermostat. Enzyme is added to the system and as its activity and other properties are given, the temperature, pH and ionic strength of the mixture can be regulated exactly forward and the time required for the degradation can be defined to achieve the desired particle size.

The amount of enzyme is such as to be able to quantitatively cover the biopolymer particle and thus form a protein mantle on the particle. When the desired particle size is achieved, the oil is added by means of an emulsifier to form the oil into small droplet as a result of which the oil mantle is formed around the protein layer which surrounds the biopolymer particle, and the degradation process is immediately stopped since the oil prevents the action of the enzyme by isolating it from the water and by bonding to the enzyme protein. A mantle of oil is collected around the protein mantle in this manner. The amount of oil is about 0.5–15% of the amount of the biopolymer, depending on the quality and mixing conditions of the biopolymer.

In the stage in which the oil is added to the biopolymer mass, the mixture is further stirred vigorously, in which the temperature is rapidly decreased, preferably to below 10° C.

It is at this time desirable to separate the particles, coated with protein and oil, from the suspension and from the small molecules dissolved in the suspension, from the dextrine in the case of starch and low sugars. The mixing is stopped and the particles are separated from the suspension either by permitting the same to precipitate or by centrifuging. From the standpoint of the invention, it is very important that the obtained biopolymer particles are free from split products, since otherwise large particles are reformed in the preparation of a optimal master batch and during the preparation of the film, and for example, the dextrines burn in the temperature used in the preparation. The enzyme has, for example, split dextrines from starch to obtain small particles. The split dextrines must be removed from the mixture, which is the reason that the particles are centrifuged or decanted. Since it is important that all the dextrines be removed, the particles are washed with water before drying. They are then pulverized and mixed with the other film material.

The particles should be separated by decanting or centrifuging, wherein the water phase is removed, not directly by drying, because in that case, aggregates of particles are formed that contain small molecules such as dextrines. After the separation, the particles are dried from the suspension, by spray drying. After the drying, the particles are pulverized. This is most preferably effected by the so called FP method (a fine pulverization technology developed by Oy Finnpulva Ab, as disclosed in their brochure). This method is carried out so that the particles collide under high pressure and small volume, rapidly against each other, to in effect pulverize the particles mechanically. Air and the mixed material to be pulverized in this method are led through two notches to a collision line at a suitable angle. The temperature can be maintained in a desired range so that the material will be absolutely dry.

According to the invention, it is also possible, and at time preferable, to carry out the pulverization using previously known methods, for example by means of mills. After the pulverization, it is preferable to granulate the particles into granulates together with the synthetic polymer in a screw extruder. The granulates contain about 60–80% biopolymer. These granulates form a so-called masterbatch, or a premixed preparate, that contains biopolymer and synthetic polymer. A melt mass coming from the screw extruder, is split into pellets and cooled in an air stream. The pellets can also be cooled with water and thereafter dried. A suitable synthetic polymer is, for example, polyethylene. The granulation must be carried out with a polymer which has the right melting index depending on the biopolymer. These granulates form the premixed preparate of biopolymer and synthetic polymer.

If it is desired to include a catalyst in the film, a second premixed preparate is made in granulate form that consists of a metal catalyst and a synthetic polymer and this can also be carried out in an extruder. The metal catalyst may be for example, anhydrous $FeCl_3$ and in this premix, its concentration is 0.1–1%. Other usable metal catalysts include, for example $Cu^{2+}$, $Se^{2+}$, $Zn^{2+}$, which, in other words, are known oxidation agents for vegetable based oils, that are necessary, for example to form carbonyl groups, when the C—C bonds are split. The carbon chains can then be degraded biologically from these groups.

The melting index of the used polymers is preferably about 4, which means that the preparation temperature of the plastic film can be about 150° C. Since in accordance with the preferred embodiment of the invention, the process proceeds using premixed preparates from both the catalyst and the biopolymer ("the masterbatches), any real mixing in this case is not carried out inside the film extruder, but instead, the premixing occurs in a prior extruder. It is possible to carry out the real mixing as late as the film extruder. If a catalyst is used, it is preferred to keep it separate from the biopolymer as long as possible.

In the actual film extruder, the final film is then prepared by feeding into the extruder, in accordance with an advantageous embodiment of the present invention:

(a) a premix of catalyst (masterbatch I), that contains 0.1–1% metal catalyst and synthetic polymer, (b) a premix of polymer (masterbatch II), that contains 60–80%, preferably about 60%, biopolymer and synthetic polymer, and (c) in addition, and if desired, and depending on the desired final product, 1–50% synthetic polymers and additives can be added to the film extruder, for example, pigments and other optical agents.

All the compounds that are desired to be present in the final film are mixed in the film extruder.

The transmission and absorption of the radiation of the film depends on the added particle amounts and so called pigment component. Dye can be added, either by pressing it against the surface of the film, or by mixing with the film material. The degradation age of the final film is longer the less particles is less larger particles are used, and on the other hand, the more oil or catalysts used, the shorter the degradation age.

The catalyst is kept separate until it is added to the film in as late a stage as possible. Generally, it is added to the film because it is not certain that there is enough catalyst in the earth or that the degradation effect of the UV-light will be sufficient. The material of the invention is essentially dry until it reaches the earth.

The amount and the size of the particles of the biopolymer are selected so that there are contacts between the same and so that they are able to absorb water, become wet and thus be degraded by means of microogranisms. The film will not break too soon when the proportional amounts of the biopolymer and the synthetic polymer are properly selected. If there are too many particles in the film material, the strength properties become lessened. In accordance with the invention, a required amount of the biopolymer is homogenously included in the film, also in thin films, so that it can be degraded biologically. The earth receives new nutritives when the film is degraded because all of the additives are of such quality as to act as earth improving agents when they are degraded. The cover film of the invention is thus an extremely advantageous film to be used in plant growing and it is degraded in the environment and the rate of degradation can be regulated after the use (one month to two years). The strength of the film can be regulated to withstand the application conditions by taking the thickness of the film, the fastening technique and weather conditions into consideration. In addition, the particle size of the biological material is regulated after the use.

The film material of the present invention can also be used as packing material.

The present invention affords a new advantageous way to include reactive groups in film materials since the biological material is coated with chemically reactive material, with vegetable oil, the effect of which is directed to the carbon-carbon bonds of the polymer and the coatings of the particles of the invention have a positive influence on their mixing properties with the synthetic polymers. In use, the layer of film that absorbs light best, is placed against the surface of the earth, and the entire film is fastened on the surface of the substrate. The rate and manner of degradation of the film is regulated so that weeds do not have time to produce seeds during the growing season. The film is regulated to remain until the end of the growing season and the degradation proceeds by way of a "fragment form" that is harmless from the standpoint of the harvesting of the crops. The final degradation by moulding takings place at the beginning of the following growing season.

The variation possibilities of the film material of the invention are extensive and have several advantages.

The film can advantageously be used in connection with the method in which the entire area of the growth surface is covered with a cover film, in which method the growth of the weed is prevent (Finnish Patent Application No. 891906).

The film transmits light and the plant penetrates the film only at sowing and setting time. The use thereof raises the average temperature of the growth and retains moisture, at the same time that the forming of a temperature or humidity gradiant in the earth is prevented. Under the film, the earth becomes overgrown with grass, in other words, the biological activity increases and the compression of the earth is prevented. The up take of food by the plants is improved, the need for fertilization is decreased, ventilation occurs earlier and the yield is increased. The ability of the plants to withstand diseases and their preserving properties are improved.

The cover film of the invention and the cover growing technique form a new growing culture and the advantages thereof as best used in the application system of the Finnish Patent No. 891905.

DESCRIPTION OF PREFERRED EMBODIMENT

The following example is given to further illustrate the present invention. The scope of the invention is not, however, meant to be limited to the specific details thereof.

EXAMPLE 500 kg barley starch (dry) was suspended in 100 liter of cold aqueous suspension of $CaCl_2$ containing 500 mg calcium per liter. The pH of the suspension was regulated to between 6.0–6.5. The suspension was vigorously agitated.

The temperature of the suspension was raised in a thermostatic reaction vessel to 55° C. during vigorous agitation.

100 mili. novo units of $\alpha$-amylase enzyme was added to the suspension in a 5 liter vessel and maintained therein until the average particle size of the barley starch was decreased to a value below 500 $\mu$m. This required fifteen minutes.

The suspension of starch-enzyme wa added to 50 liter vegetable oil (rape oil) containing a small amount of an emulsifier. The suspension was vigorously agitated while cooling to a temperature of 10° C.

The cold suspension was left standing for twelve hours whereby the particles coated with enzyme and oil precipitated to the bottom of the reaction vessel and the oil that had not been bound to the particles was separated on the surface of the water.

The aqueous phase was removed from the reaction vessel between the precipitate of the particles and the thin oil layer on the surface.

500 liters $CaCl_2$ solution (the same as at the start of the process) was added to the concentrated suspension and vigorously agitated so that the remaining water soluble small molecules were washed away with the aqueous suspension. The suspension was then permitted to stand for twelve hours under cool conditions. The aqueous layer was again removed.

The concentrated suspension was vigorously agitated so that all of the added oil was mixed with the particles. The suspension was dried with a spray dryer provided with a nozzle of the Rotary Atomizer type so that the dry content of the final product was 95%.

The dried powder was finely divided by a spray divider to decompose the larger particles formed in the spray dryer back to the particle structure formed in the reaction vessel and at the same time the particles were dried to a dry content of 99%. The spray powdering device used was the Finnpulva Oy FP2 device. A pressure of 7 bar and a temperature of 150° C. was used in the FP2 device.

From the powder produced in the FP2 device, the distribution of the particle size was defined by means of a Malvern 2600 device to define a suitable enzyme concentration and reaction time in the reaction vessel so that the desired particle size was obtained.

The resulting powder was mixed with polyolefin in a film extruder and the resulting film was extruded therefrom for use as covering for growing plants, and the like.

While the invention has been described with respect to specific details, it is apparent that variations and modifications of the invention can be made without departing from the spirit or scope thereof.

What is claimed is:

1. Method of preparing a biologically degradable film composed of non-biologically degradable synthetic polymer and a biologically degradable polymer, which comprises
    subjecting particles of said biologically degradable polymer (biopolymer) in aqueous suspension to enzymes that split said biologically degradable polymer to small molecules which are released from the surface of the biopolymer particles and continuing the subjecting of said biologically degradable polymer to said enzymes until particles of predetermined small size are obtained,
    emulsifying the thus formed biopolymer particles of predetermined small size with a vegetable oil to coat the thus formed particles with the vegetable oil, thus isolating the enzyme from the water of the aqueous suspension and interrupting the degradation of the biopolymers by the enzymes, the enzymes remaining on the biopolymer particles,
    separating the thus vegetable oil-coated particles from the suspension, drying and then pulverizing the same, and
    mixing the thus obtained pulverized biopolymer particles with said synthetic polymer and forming a film therefrom in a film extruder, wherein the biopolymer degradation continues only after oxidation of the oil film which permits contact of the enzymes with moisture.

2. Method according to claim 1 wherein said synthetic polymer is a polyolefin.

3. Method according to claim 1 wherein said biologically degradable polymer is starch, cellulose, rye flour or wheat flour.

4. Method according to claim 3 wherein said synthetic polymer is a polyolefin.

5. Method according to claim 1 wherein a catalyst which catalyzes oxidation of the oil is added to the biopolymer and synthetic polymer to form the film therefrom.

6. Method according to claim 5 wherein said catalyst is an oxidant for vegetable oils.

7. Method according to claim 1 wherein the pulverized biopolymer particles are granulated with a synthetic polymer film forming material and the formed granulate is then extruded into a film.

8. Method according to claim 7 wherein a catalyst which catalyzes oxidation of the oil is mixed with the synthetic film forming polymer before said film forming polymer is mixed with the biopolymer.

9. Method according to claim 1 wherein the predetermined particle size is between about 0.5–10 $\mu$m.

10. Method according to claim 7 wherein the amount of the biologically degradable polymer in the mixture thereof with the synthetic polymer is about 60–80% by weight.

11. Method according to claim 1 wherein the vegetable oil is soya, rape or sunflower oil.

12. Method according to claim 1 wherein the biopolymer is a starch and the enzyme is $\alpha$-amylase, and wherein calcium chloride is added to the water and the water is heated to a temperature such that the pH, calcium ion concentration and temperature are suitable for $\alpha$-amylase degradation of the starch.

13. Method according to claim 1 wherein the dried particles are pulverized by causing the same to collide with each other at high speed and at a temperature such as to obtain a dry material.

14. Method according to claim 7 wherein the granulation is effected by means of a screw extruder and the granulated particles are then subjected to air drying.

15. Method according to claim 1 wherein the melting index of the synthetic polymer is about 4.

16. Method according to claim 1 wherein the proportion of biopolymer to synthetic polymer is about 10–60% biopolymer and about 40–90% synthetic polymer.

17. Method according to claim 16 and also including about 0.01–0.1% catalyst which catalyzes oxidation of the oil.

18. Method according to claim 8 wherein said catalyst is an oxidant for vegetable oils providing $Fe^{3+}$, $Se^{2+}$, $Cu^{2+}$ or $Zn^{2+}$ and the amount thereof is between 0.05–1% by weight of the catalyst and synthetic polymer.

19. Method according to claim 1 wherein the biologically degradable polymer is a starch and wherein the enzyme is $\alpha$-amylase that splits dextrins from starch.

20. Method according to claim 1 wherein the biologically degradable polymer is a cellulose and wherein the enzyme is endoglucanase that splits cellodextrins from cellulose.

21. Method according to claim 1 wherein the biologically degradable polymer is a cellulose and wherein the enzyme is cellobiohydrolase that splits cellobiose from cellulose.

* * * * *